(12) United States Patent
Brown et al.

(10) Patent No.: US 8,191,003 B2
(45) Date of Patent: May 29, 2012

(54) MANAGING TRANSPARENT WINDOWS

(75) Inventors: Douglas S. Brown, Charlotte, NC (US);
Jehan Moghazy, Philadelphia, PA (US);
James R. Rudd, Charlotte, NC (US);
Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 11/674,702

(22) Filed: Feb. 14, 2007

(65) Prior Publication Data

US 2008/0195969 A1    Aug. 14, 2008

(51) Int. Cl.
*G06F 3/048* (2006.01)
(52) U.S. Cl. ............. 715/769; 715/768; 715/797
(58) Field of Classification Search .............. 715/766, 715/768, 788, 764, 769, 783, 789, 794–797, 715/802, 835–838
See application file for complete search history.

(56) References Cited

U.S. PATENT DOCUMENTS

| | | | |
|---|---|---|---|
| 5,463,728 A | | 10/1995 | Blahut et al. |
| 5,651,107 A | | 7/1997 | Frank et al. |
| 5,786,818 A | * | 7/1998 | Brewer et al. .............. 715/822 |
| 5,805,163 A | * | 9/1998 | Bagnas ................... 715/768 |
| 5,896,131 A | | 4/1999 | Alexander |
| 6,356,281 B1 | | 3/2002 | Isenman |
| 6,429,883 B1 | * | 8/2002 | Plow et al. ............... 715/768 |
| 6,587,126 B1 | | 7/2003 | Wakai et al. |
| 6,806,892 B1 | | 10/2004 | Plow et al. |
| 7,124,272 B1 | * | 10/2006 | Kennedy et al. ............ 711/173 |
| 2004/0066414 A1 | * | 4/2004 | Czerwinski et al. .......... 345/781 |
| 2007/0226642 A1 | * | 9/2007 | Soulier ................... 715/768 |
| 2009/0171866 A1 | * | 7/2009 | Harun et al. .............. 706/12 |

FOREIGN PATENT DOCUMENTS

| | | |
|---|---|---|
| EP | 0349459 A2 | 1/1990 |
| EP | 0514307 A2 | 11/1992 |
| EP | 0684542 A1 | 11/1995 |

OTHER PUBLICATIONS

ISR including PCT transmittal, From the International Searching Authority, mailed Apr. 16, 2008, Applicant: International Business Machines Corporation, International Application No. PCT/EP2008/050823, pp. 6.
PCT Written Opinion of International Searching Authority, Applicant: International Business Machines Corporation, International Application No. PCT/EP2008/050823, pp. 6.

* cited by examiner

*Primary Examiner* — William Bashore
*Assistant Examiner* — Andrew Tank
(74) *Attorney, Agent, or Firm* — Mark C. Vallone; Schubert Law Group PLLC (57) ABSTRACT

Methods and arrangements to manage transparent windows are described herein. Embodiments may comprise logic such as hardware and/or code to select one or more windows to make transparent and to switching the active window between source and target windows via the position of the mouse. Many embodiments provide a right click, pop-up menu (i.e., pressing the right mouse button generates a pop-up menu), a pull-down menu, or a button associated with windows. These features may allow a user to select individual or all windows to be transparent. A transparent window provides some view of windows or objects below the transparent window while providing some view of the contents such as graphics and/or text in the transparent window. Embodiments may also include management logic such as hardware and/or code to facilitate selection of a transparent window to make the window active.

24 Claims, 6 Drawing Sheets

FIG 1

MANAGING TRANSPARENT WINDOWS

FIELD

The present invention generally relates to computer graphical user interfaces (GUIs). More particularly, the present disclosure relates to methods and arrangements to manage transparent windows.

BACKGROUND

A graphical user interface (GUI) for computer systems typically include a capability to present on a screen space a plurality of windows each of which may have a different application running under it, providing a user with the appearance of the multitasking capabilities. The last window used or opened remains the active window until the user selects another window as the active window. The active window is the window in which actions are performed and is located at the uppermost layer of the GUI. For instance, when the user presses a paste button, the paste occurs in the active window and if the user types, the resulting text appears at the last cursor location in the active window.

Open windows other than the active window are within layers below the active window. The higher the layer within which a window resides, the higher the priority for displaying the window's contents. In other words, higher layer windows block or obscure content in lower layers of the GUI and the desktop is typically at the bottom or lowest layer of the GUI.

More often than not, a user takes advantage of the multitasking capability by opening separate windows for each application. However, the display or monitor upon which the user displays the plurality of windows has a screen space limited by the physical size of a display or monitor so the task of managing the windows becomes increasingly difficult as the number of open windows increase.

The current GUI technology enables users to manually resize the active window by minimizing, maximizing, and dragging the corners of the active window to a desired size. For example, if a window size is larger than the content displayed on it, the user typically minimizes the window to a size needed to display the content, leaving the background area in the screen space for other use.

In other cases, the content of the window, such as text and graphics, may need a larger display area than the initial window size so the user can scroll through the window and/or manually resize the window by maximizing or dragging the corners of the window to a desired size that increases the viewable content contained in the window. For instance, when lines of text extend past the right edge of a window displaying the text, the user can manually scroll the active window via a scroll bar between the left and right portions to view the text.

The manual scrolling becomes a burdensome task, especially when the user needs to navigate back and forth between left and right sides of the windows in order to view the content. While the user may maximize the active window to reduce the problem associated with manual scrolling, maximization typically results in overlapping and covering up additional screen space, and thereby obscuring the view of inactive windows and other displayed items or objects in the screen space.

Inevitably, the overlapping, higher-layer windows visually obscure inactive windows. The multiple windows are presented in disarray, requiring considerable time and effort by users to search for desired windows or other objects such as icons on the desktop. Frequently, users do not even realize that they have various inactive windows open and may even open a duplicate window, compounding the problem.

Managing the multiple, overlapping and obscured windows is particularly challenging while transferring information between two or more of the windows. Transferring information from a source window to a target window requires the user to know where each window is located or find each window in the z-order or on the toolbar. For cases in which the source and target windows are fully or partially covered, this can be time consuming and otherwise detrimental to productivity. For example, when transferring information involves copying and pasting, the user has to find and activate the source window, copy the content of interest from the source window, locate and activate the target window, paste the content, and potentially find and activate the source window again to copy and paste additional content.

More specifically, to switch the active window between the source window and the target window, the user must either recognize the tabs or the window descriptions of the source and target windows or select each available tab or window until the source and target windows are found. Due to the limited space for the descriptions and the accommodation for a variable number of windows, the descriptions may be severely abbreviated. In many situations, the user finds it more convenient to reduce windows to icons or tabs until the appropriate window is located and/or open and activate the windows until the appropriate window is found. In other situations, the user may size windows to leave non-overlapping portions and click on the non-overlapping portions of the windows to activate each window in some order until the target or source window is found. Clicking on the non-overlapping portion typically raises the corresponding application window to the uppermost layer of the desktop, obscuring previously activated windows.

When there is a need for the simultaneous viewing of information contained in the two different application windows, the user may resize the corresponding application windows so they are small enough to fit next to one another on the display but still retain sufficiently large text and graphics to remain usable. While average display sizes have been steadily increasing, many users still find it difficult to have more than one window viewable at one time. Thus, after viewing or transferring content, the user typically resizes the windows back to a more useable size. When the user just wants to copy content from one window and paste the content into the other, this conventional methodology can be disruptive and time consuming, significantly impacting productivity.

Productivity is further impacted when there is more than one target and/or source window and the source window of interest is not directly beneath the target window. For instance, the user may be working with three or more windows and the target window may be on top while the source window is several layers beneath the target window. Typically, the user would have to resize, move, minimize, and/or scroll through windows on the display to make the source window active. Such procedures significantly impact the speed at which copying and pasting can occur.

Current solutions involve transparent windows. Making one or more windows transparent can allow the user to either view the content of more than one of the windows at a time even on displays that are not sufficiently large to display the windows next to one another. Furthermore, the use of transparent windows can allow the user to locate the window of interest more quickly. However, the current solutions do not offer a convenient way to switch between active windows or otherwise manage the transparent windows during the performance of a task.

SUMMARY OF THE INVENTION

The problems identified above are in large part addressed by methods and arrangements provided herein to manage transparent windows of a graphical user interface. One embodiment comprises a method to manage transparent windows of a graphical user interface. The method may involve identifying one or more windows of the graphical user interface as one or more transparent windows and displaying content of a lower layer of the graphical user interface through the one or more transparent windows. The method may also involve detecting movement of a pointer of the graphical user interface to a position over a non-overlapping portion of one of the one or more transparent windows and activating the one of the one or more transparent windows in response to the movement of the pointer to the position.

Some embodiments involve activating a previously active window in response to pasting copied content into the one of the one or more transparent windows in addition to the method as described above. Other embodiments involve receiving user input to select the one or more transparent windows in addition to the method as described above. In such embodiments identifying the one or more windows may comprise interpreting the user input as an instruction to adjust the appearance of the one or more windows to display the content of the lower layer. Further embodiments include toggling the visibility of objects on the desktop of the graphical user interface by toggling the visibility of objects via transparent windows and/or toggling the opaqueness of the transparent windows with respect to objects on the desktop.

In further embodiments, identifying the one or more windows comprises associating selection of a pop-up menu item with an instruction to toggle the transparency of the one or more windows. While in several embodiments, displaying the content of the lower layer comprises displaying at least a portion of an inactive window on the lower layer through the one or more transparent windows.

In one embodiment, displaying the content of the lower layer comprises displaying at least a portion of the desktop of the graphical user interface. In a further embodiment, detecting the movement of the pointer comprises receiving input from a mouse and determining that the input from the mouse changes the location of the pointer to the position.

In still another embodiment, detecting the movement of the pointer comprises detecting the movement of the pointer after copying content of an active window in response to user input. And, in some of these embodiments, activating the one of the one or more transparent windows in response to the movement comprises activating the one of the one or more transparent windows in response to the copying and the detection of the movement.

Another embodiment comprises an apparatus to manage transparent windows of a graphical user interface. The apparatus may comprise a user input interface to receive user input from an input device; management logic to identify one or more windows of the graphical user interface as one or more transparent windows, detect movement of a pointer of the graphical user interface to a position over a non-overlapping portion of one of the one or more transparent windows, and activate the one of the one or more transparent windows in response to the movement of the pointer to the position; and a display module to display content of a lower layer of the graphical user interface through the one or more transparent windows.

Another embodiment includes a machine-accessible medium containing instructions, which when executed by a machine, cause said machine to perform operations. The operations may comprise identifying one or more windows of the graphical user interface as one or more transparent windows and displaying content of a lower layer of the graphical user interface through the one or more transparent windows. The operations may also comprise detecting movement of a pointer of the graphical user interface to a position over a non-overlapping portion of one of the one or more transparent windows and activating the one of the one or more transparent windows in response to the movement of the pointer to the position.

A further embodiment comprises a method to manage transparent windows of a graphical user interface. The method may involve identifying one or more windows of the graphical user interface as transparent windows and displaying content of a lower layer of the graphical user interface through the one or more transparent windows. The method may also involve detecting a content transfer associated with one or more of the transparent windows and activating the one of the one or more windows in response to detection of the content transfer.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of novel embodiments depicted in the accompanying drawings. The embodiments are in such detail as to clearly communicate the subject matter. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements to manage transparent windows are described herein. Embodiments may comprise logic such as hardware and/or code to select one or more windows to make transparent and to switching the active window between source and target windows based upon the position of a pointer for, e.g., a mouse. Many embodiments provide a right click, pop-up menu (i.e., pressing the right mouse button generates a pop-up menu), a pull-down menu, or a button associated with windows. Further embodiments implement other methods of selecting or identifying transparent windows such as selection or identification via a key or key combination on a keyboard, one or more voice commands, sensors of a touch screen or touch pad, or other input device. These features may allow a user to select individual or all windows to be transparent. For example, pressing the right mouse button while the mouse is on a window presents the user with an option to make the window transparent, pulling down a main menu presents the users with an option to select windows to be transparent and/or make all windows or open windows transparent, and clicking on a button on the edge of a window toggles the window between transparent and non-transparent.

A transparent window provides some view of windows or objects below the transparent window while providing some view of the contents such as graphics and/or text in the transparent window. In some embodiments, transparent windows provide at least an indication of an outline of the window as well as text or graphics in a manner that does not obscure the text or graphic in a window at a higher layer of the GUI. In many embodiments, the object(s) on the desktop may be visible or not visible through one or more transparent windows. In some of these embodiments, users may identify transparent windows that are opaque with respect to objects on the desktop and/or identify objects that are not visible through the transparent windows.

Embodiments may also include management logic such as hardware and/or code to facilitate selection of a transparent window to be active. For instance, a user may open three windows to prepare a document. The first window may include the document to be prepared. The second window may include a first reference and the third window may include a second reference. The user may want to transfer content (e.g., copy and paste or drag and drop) from both references so the user may select an option from a pull-down menu to toggle all three windows to be transparent. The management logic may track the three windows as well as the position of the mouse pointer. When the user wants to copy content from the second reference, the user may move the mouse pointer over a non-overlapping portion of the third window and the management logic may automatically make the third window active.

In some embodiments, the management logic may also predict, e.g., copy/paste activity upon toggling on the transparency for the three windows. For instance, when the mouse pointer moves over the third window and the third window become active, the copy or paste function may automatically activate. If a copy event just occurred in another window, the user may be able to paste text at a location in the third window by simply clicking a mouse button at the location. On the other hand, if a paste function recently occurred or neither the paste nor copy functions recently occurred, the copy function may be activated and the user may copy text and/or objects by highlighting or otherwise selecting the text and/or objects. The management logic may then make the previously active window active again. In other embodiments, the management logic may generate a pop-up menu after copying with a list of transparent windows so the user may select a window for pasting the copied content.

In still further embodiments, after assigning transparency to one or more windows, the management logic may toggle between designated windows in response to an event such as copying text. For example, the user may toggle two windows to be transparent of two or more open windows. Management logic may watch for a user event such as copying text in one of the windows and automatically make the second window active. The user may then paste the content in the second window. In several embodiments, after pasting the content in the second window, the management logic may make the first window the active window again to facilitate additional copying.

While specific embodiments will be described below with reference to specific logic configurations, those of skill in the art will realize that embodiments of the present disclosure may advantageously be implemented with other logic configurations.

Figure 1:
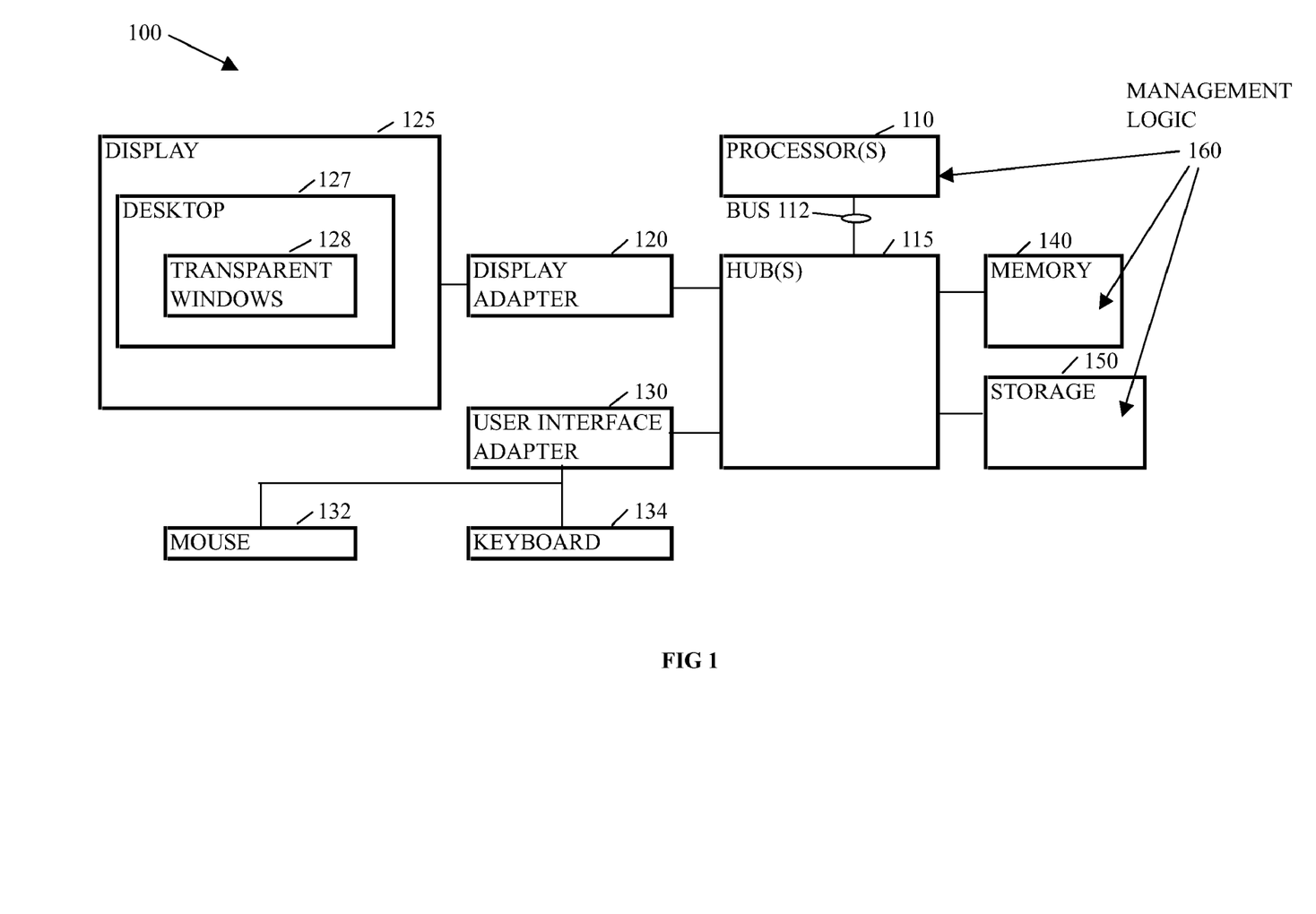
FIG. 1 depicts a system including a display with a graphical user interface (GUI) implementing transparent windows with logic to manage the transparent windows.

Turning now to FIG. 1, there is shown a computer system 100 suitable for management of transparent windows of a graphical user interface (GUI). More particularly, computer system 100 comprises logic including code for execution by processor(s) 110 to select one or more windows to make transparent and to switch the active window between source and target windows based upon the position of a mouse pointer of the GUI. Processor(s) 110 may identify the windows to make transparent and a display adapter 120 may process the pixels to display on a display 125 based upon the identification of the transparent windows 128.

The code for processor(s) 110 may reside in data storage such as a storage 150, a lower-latency storage such as memory 140, and various levels of cache associated with processor(s) 110. When processor(s) 110 are ready to execute the code, the code may be retrieved from cache, memory 140, and/or storage 150. For example, after the user selects windows to turn transparent and instructs processor(s) 110 to make the windows transparent via a pull-down or pop-up menu, processor(s) 110 may execute code related to identifying transparent windows. In some of these embodiments, the user may also select whether the object(s) on the desktop will be visible through the transparent windows 128 or whether the transparent windows 128 are opaque with respect to the object(s), and processor(s) 110 may execute code to identify visible and invisible objects on the desktop.

Adjustment of the pixels may involve displaying portions of the pixels in the windows and modifying the colors of some of the pixels, while not displaying other pixels. Adjustment of the pixels is performed by algorithms designed to provide the appearance of transparency for transparent windows 128 on display 125 so the user can view portions of windows and/or portions of the desktop 127 that would not otherwise be viewable due to the placement of transparent windows 128. In other embodiments, processor(s) 110 may execute the algorithms to process the pixels of the transparent windows and identify the pixels for display adapter 120.

When the user begins to copy content of a first window to a second window of transparent windows 128, the code executed by processor(s) 110 may include at least a portion of management logic 160 to manage the behavior of the transparent windows 128. For instance, after copying text in the first transparent window, the management logic 160 may include instructions to responsively switch to the second window to facilitate pasting the content in the second window.

When first accessed, the management logic 160 may be retrieved from memory 140 and one or more levels of cache for processor(s) 110. Subsequent accesses to the code for management logic 160 may be at one or more of the levels of cache, depending upon the frequency with which the code for management logic 160 is accessed. For example, if the user often instructs computer system 100 to toggle the transparency of transparent windows 128 via a pop-up menu after pressing the right mouse button on the corresponding windows but does not use a pull-down menu option to toggle the transparency of transparent windows 128, the code for implementing the pop-up menu may reside in cache while the code for the pull-down menu may reside in memory 140. The various levels of cache are not shown but typically include memory cells integrated with processor(s) 110 and memory devices located very close to each and/or all processor(s) 110.

In some embodiments, at least two windows must be transparent for the management logic 160 to responsively switch from a first transparent window to a second transparent window after copying text and/or objects in the first transparent window. In other embodiments, if the user creates a single transparent window, the management logic 160 may assume that the transparent window is either the source of text or objects to copy, or the target within which to paste copied content. Thus, if the user copies content from a window that has not been made transparent by the user, the management logic 160 may activate the transparent window so the user can paste the content. In further embodiments, such behavior is included in preferences associated with the management logic 160 and stored in storage 150, memory 140, and/or cache associated with processor(s) 110.

Computer system 100 may be a general purpose or specific purpose computer system such as a distributed computing system, supercomputer, high-performance computing system, computing cluster, mainframe computer, client-server system, workstation, server, notebook or laptop computer, desktop computer, PDA, mobile phone, wireless device, set-top box, or the like. At least certain of the components of computer system 100 may be mounted on a multi-layer planar or motherboard (which may itself be mounted on the chassis) to provide a means for electrically interconnecting the components of the computer system 100.

In the depicted embodiment, the computer system 100 includes processor(s) 110, hub(s) 115, display adapter 120, a user interface adapter 130, memory 140, and storage 150. Processor(s) 110 may include one or more system central processing units (CPUs) or processors to execute instructions, such as an IBM® PowerPC™ processor, an Intel Pentium® processor, an Advanced Micro Devices Inc. processor, or any other suitable processor.

Bus 112 facilitates communication between the processor(s) 110 and other components of the computer system 100 via hub(s) 115. Bus 112 may comprise a large parallel bus such as a 32-bit or 64-bit bus or one or more high-speed serial buses. A main bus arbiter (not shown) may arbitrate traffic on bus 112 to coordinate transference of packets and avoid starvation of any particular source or recipient of the traffic.

Hub(s) 115 may comprise one or more bridges between bus 112 and other buses such as a peripheral component interface (PCI) bus, low pin count bus, universal serial bus (USB), or the like. In some embodiments, for instance, hub(s) 115 may comprise a memory controller hub (MCH) to facilitate traffic to and from memory 140 and an input-output (I/O) controller hub (ICH) to facilitate traffic from I/O devices such as a mouse 132, a keyboard 134, storage 150, a remote device or computer via a network connection, and/or the like.

Processor(s) 110 couple with display 125, such as an LCD display or CRT monitor, via display adapter 120. Processor(s) 110 also couple with user interface devices such as a mouse 132 or keyboard 134 via a user interface adapter 130 to interact with a user via a GUI. While processor(s) 110 execute code to provide the GUI, display adapter 120 presents the GUI to the user via display 125. User interface adapter 130 may also connect with other types of user input devices, such as touch pads, touch sensitive screens, electronic pens, microphones, etc.

The GUI is illustrated as desktop 127 and transparent windows 128 in the present embodiment. Desktop 127 may represent a lowest layer of the GUI such that if other, non-transparent items reside on a layer above the desktop, the corresponding portions of desktop 127 will not be visible. For instance, objects such as files or folders that reside on desktop 127 are at a higher layer than desktop 127 but at a lower layer than transparent windows 128 so the objects will prevent the display of portions of desktop 127 that they overlap.

Transparent windows 128 reside at a layer above the objects of desktop 127 but hide or obscure the objects and desktop 127 to the extent that content of transparent windows 128 overlap the objects on desktop 127. For example, if transparent windows 128 include one object and a lot of empty space, the one object may block views of the portion of desktop 127 that resides underneath the one object but the empty space may not block views and, in some embodiments, not substantially obscure desktop 127. For instance, the portion of desktop 127 beneath the empty space may have a slightly different hue than the un-obscured portions of desktop 127. In other embodiments, the user may indicate that objects on the desktop should not be visible through the transparent windows 128 to the extent the transparent windows overlap the objects.

Memory 140 stores data and code for execution by processor(s) 110. Memory 140 may include volatile memory such as random access memory (RAM), double data rate (DDR) synchronous dynamic random access memory (SDRAM), or the like. Storage 150 may be non-volatile storage such as one or more hard drives, tape drives, diskette drives, CD-ROM drive, DVD-ROM drive, flash memory, or the like.

Figure 2A:
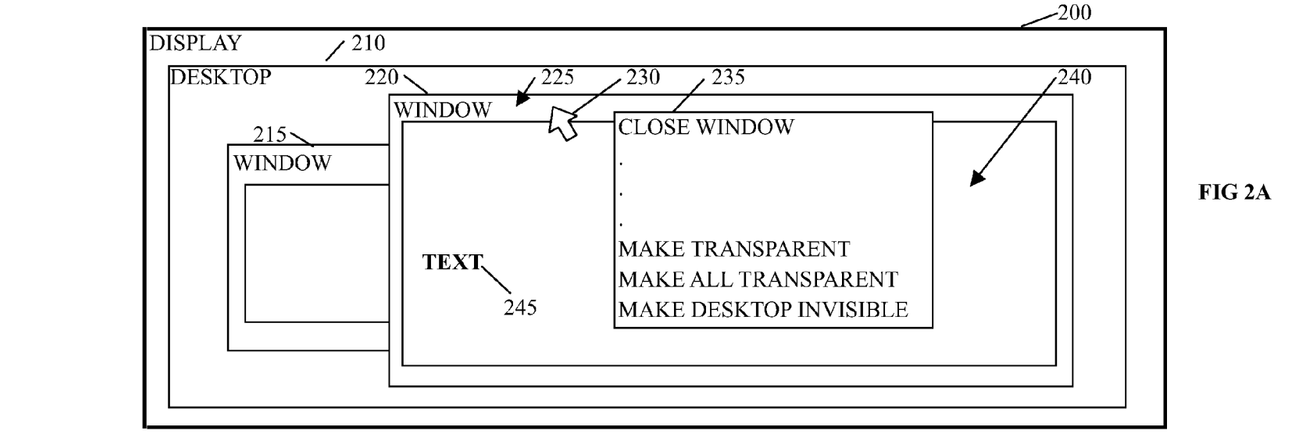
FIGS. 2A-D depicts an embodiment of a plurality of windows overlapping one another and having a transparent portion.
Figure 2B:
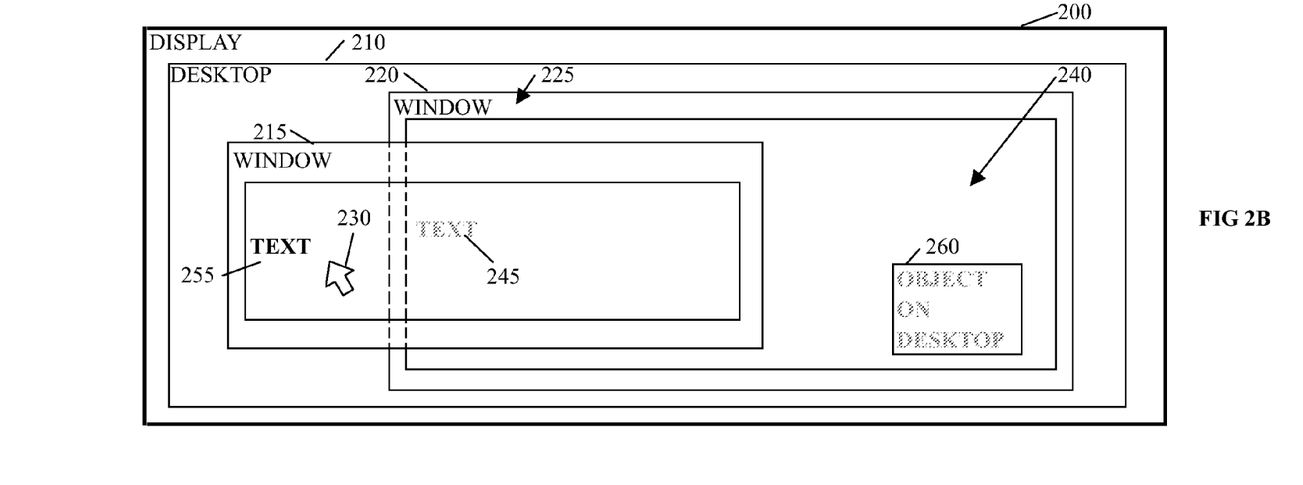
Figure 2C:
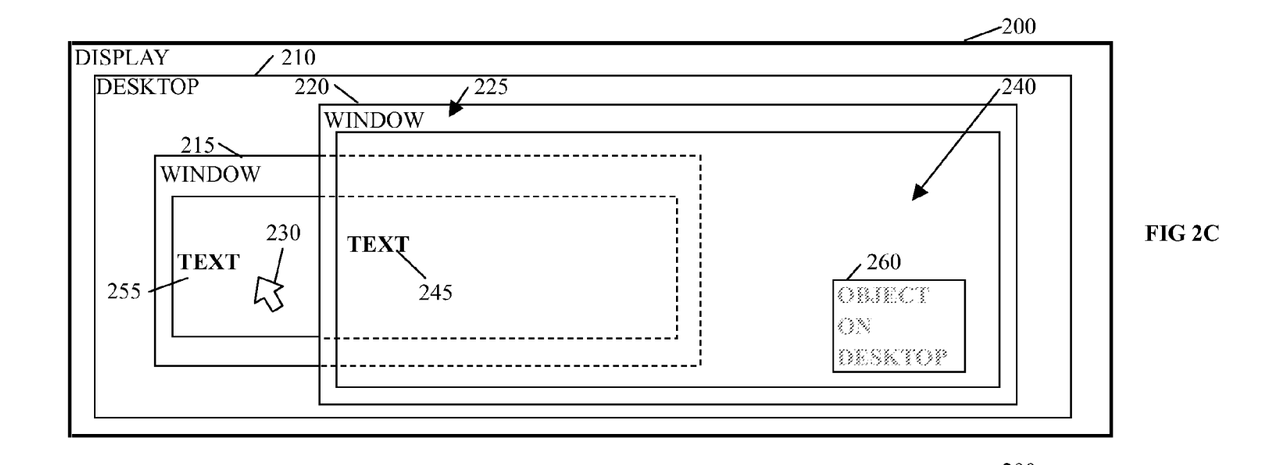
Figure 2D:
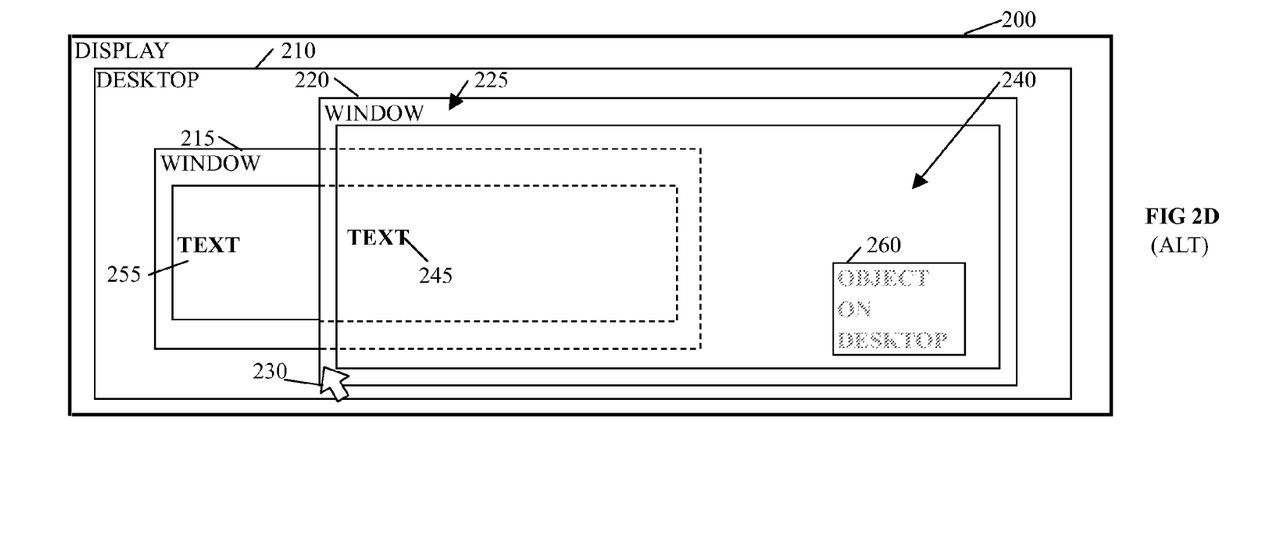

FIGS. 2A-D depict an embodiment of a display 200 having two overlapping windows that are manipulated and managed via management logic to transfer content from window 220 to window 215. FIGS. 2A-2C show various stages of progression through the transference and FIG. 2D illustrates an alternative stage for the stage described in FIG. 2C. Display 200 presents a GUI interface including a desktop 210 having an object 260, which is not viewable in FIG. 2A because it is beneath window 220. Window 220 is active and is opaque in FIG. 2A. Furthermore, window 220 has text 245 and empty space 240.

The user manipulates the GUI by moving a pointer 230 with a mouse, trackball, track pad, or the like, and has a left button and a right button. In FIG. 2A, the user moves the pointer 230 onto the border 225 of window 220 and presses the right button. In response, the management logic incorporates three options ('make transparent', 'make all transparent', and 'make desktop invisible') into a pop-up window 235 that the operating system generates in response to pressing the right button. Other embodiments may include different options.

The option 'make transparent' indicates to the user that selecting this option will make window 220 a transparent window. The option 'make all transparent' indicates to the user that selection of this option will make all open windows transparent. And the option 'make desktop invisible' indicates to the user that selection of this option will make portions of or objects on the desktop invisible if they are beneath one or more transparent windows. Other embodiments may include, for instance, an option to identify objects on the desktop that will be visible through transparent windows, an option to make all selected windows transparent or an option to list or otherwise provide a method for the user to select windows to make transparent. Further embodiments include pull-down menus, floating menus, check box menus, check boxes within the border of each window, and/or the like to allow the user to select windows to make transparent.

Upon selecting the option 'make transparent', window 220 becomes transparent as illustrated in FIGS. 2B-D. The user then copies and pastes or drags and drops text 245 from window 220 to window 215, the result of which is illustrated as text 255. In many embodiments, after the pointer 230 transitions from window 220 onto a portion of window 215 that is not overlapped by window 220, window 215 becomes the active window. In other embodiments, copying or dragging text 245 may cause management logic to make window 215 the active window.

When window 215 becomes active, window 215 overlaps text 245 in window 220. As a result, text 245, while advantageously visible and readable, is obscured. In the present illustration, transitioning the color of text 245 from black to gray obscures text 245. In other embodiments, text 245 may be obscured in other ways such as by using translucent colors, dashed lines, or any other ways that can provide the impression to the user that text 245 is obscured.

Note also that the object 260 on desktop 210 is obscured but can be seen through the empty space 240 of window 220. In other embodiments, other methods may be used to select the objects that are visible and/or obscured on display 220.

FIG. 2C illustrates functionality of management logic that reactivates the previously active window, window 220, after pasting text 245 in window 215. Such functionality facilitates copying and pasting and/or other content transfer techniques between window 220 and window 215. FIG. 2D, on the other hand, shows an embodiment in which window 215 remains the active window until pointer 230 transitions to a position on the transparent window 220 that is not overlapped by another window such as window 215. In other embodiments, the transition occurs once the pointer 230 is at a position over a transparent window that is not overlapped by another transparent window. For situations in which the user selected the option to 'make desktop invisible', object 260 would not be visible in FIGS. 2B-D through window 225.

Figure 3:
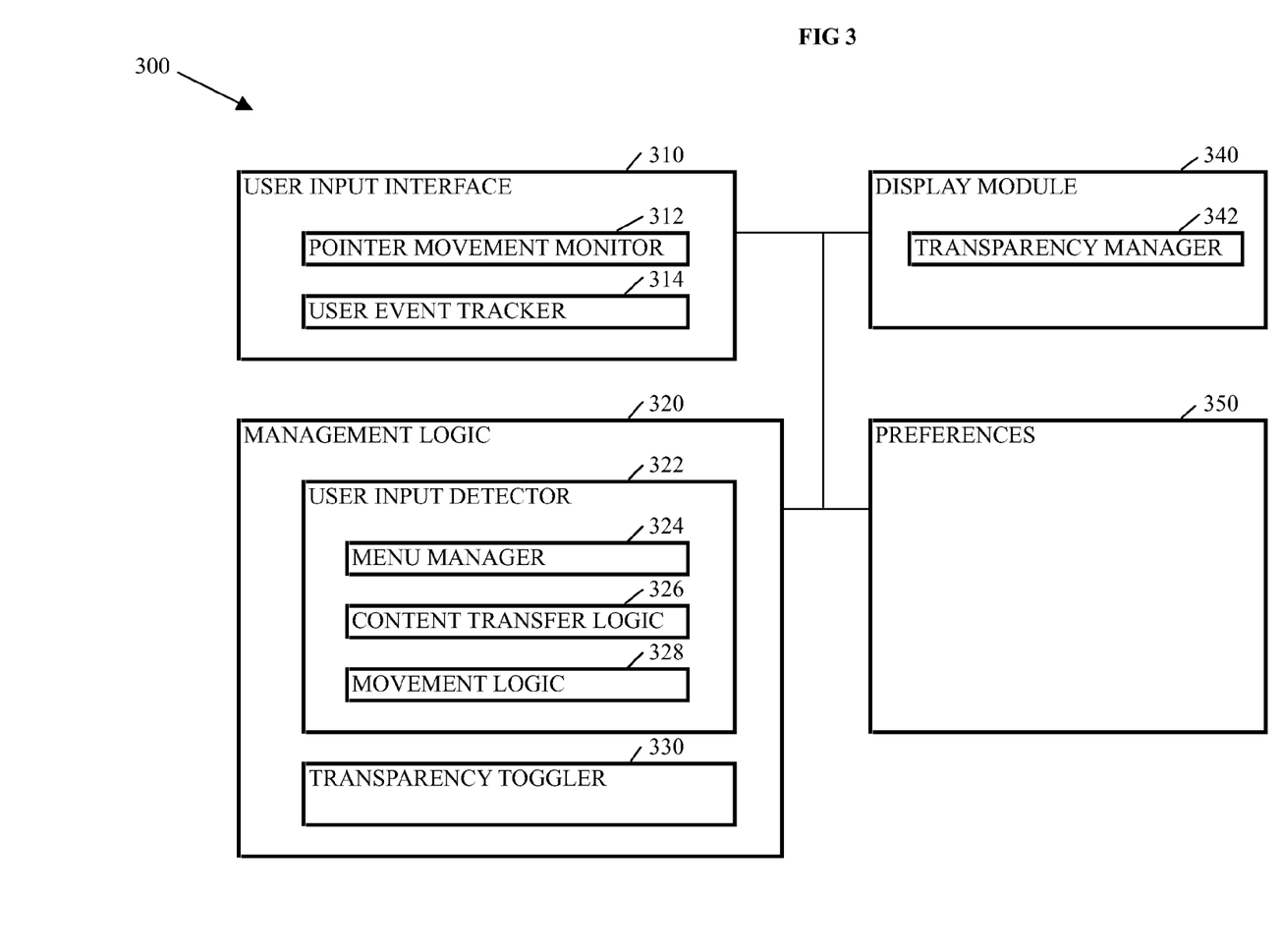
FIG. 3 depicts an embodiment of an apparatus to manage transparent windows.

Referring to FIG. 3, there is shown an embodiment of an apparatus 300 to manage transparent windows. Apparatus 300 may comprise hardware and code to create and manage transparent windows such as the transparent windows described in conjunction with FIGS. 1 and 2A-D. Apparatus 300 may comprise a user input interface 310, management logic 320, a display module 340, and preferences 350. User input module 310 may receive and track user input from devices such as a keyboard, a mouse, a trackball, and/or other user input devices that facilitate manipulation of a GUI.

In the present embodiment, user input interface 310 comprises a pointer movement monitor 312 and a user event tracker 314. Pointer movement monitor 312 may monitor movement of a pointer such as pointer 230 in FIGS. 2A-D and report positions of the pointer related to management of transparent windows to management logic 320. For instance, pointer movement monitor 312 may report movement of a pointer to a position over a transparent window that is not overlapped by another window.

User event tracker 314 may track and report user events relevant to management of transparent windows to management logic 320. For example, user event tracker 314 may detect a copy, paste, drag, drop, or other content transfer event and indicate the occurrence of such an event to management logic 320.

Management logic 320 may interpret inputs and events associated with user input to toggle and otherwise manipulate transparent windows such as the management logic described in conjunction with FIGS. 1 and 2A-D. Management logic 320 may comprise a user input detector 322 and a transparency toggler 330. User input detector 322 may detect an instruction from a user based upon one or more user inputs and preferences 350. For instance, in some embodiments, the user may store a preference to switch transparent windows to active windows if the pointer arrives at a position of a transparent window that is not overlapped by another transparent window. Thus, user input detector 322 may monitor input from user input interface 310 to determine when the pointer arrives at a location above a transparent window that is not overlapped by other transparent windows and movement logic 328 may interpret the action as an instruction from the user to make the corresponding transparent window an active window. In response, management logic 320 may make the transparent window an active window.

User input detector 322 may comprise a menu manager 324, content transfer logic 326, and movement logic 328. Menu manager 324 may manage one or more different, dynamic and/or static menus for performing functions associated with transparent windows. For instance, menu options may be incorporated in the main menus maintained by the operating system, menus of applications executing on the operating system, and/or the like. In a number of embodiments, menu manger 324 may be integrated with a browser, spreadsheet application, word processing application, or the like. In some of these embodiments, menu manager 324 may maintain menus such as a floating or anchored toolbar that offers options to make windows of the application transparent and manage the transparent windows via other resources of management logic 320. In further embodiments, code to implement functionality of apparatus 300 may be integrated into code of an operating system, applications, and/or the like.

Menu manager 324 may offer options to set or change preferences, set preferences to defaults, select one or more windows to make transparent, toggle the transparency of one or more windows, toggle the visibility of desktop objects through the transparent window(s), or the like. For example, management logic 320 may be integrated with an operating system and menu manager 324 may offer an option to select windows of applications such as browsers, spreadsheets, word processors, and the like to make transparent.

Content transfer logic 326 may monitor user activity related to the transference of content from one window to another to determine which windows to activate. In some embodiments, content transfer logic 326 may comprise learning logic or otherwise maintain data related to content transfers and automatically begin to activate windows based upon the patterns. For example, if a user selects three windows to make transparent, and the user begins to copy content from a first and second window to a third window, content transfer logic 326 may determine a pattern and begin to activate the third window in response to an instruction from the user that copies content of the first or second window. In other embodiments, content transfer logic 326 may activate the most recently active transparent window in response to copying the content of the currently active window. In further embodiments, content transfer logic may activate windows based upon a selection by the user of the window to paste content to and/or to copy content from the window via a menu option managed by menu manager 324.

Movement logic 328 may identify movement designated or predetermined to activate a transparent window. For example, movement logic 328 may identify movement of a pointer over a second transparent window immediately after copying content of a currently active, transparent window. Movement logic 328 may responsively activate the second transparent window.

Transparency toggler 330 may interact with display module 340 to toggle the transparency of one or more windows and/or the visibility of desktop objects via transparent window(s) based upon user input. For example, menu manager 324 may provide a pull-down menu to select from a list currently open windows to make transparent. Upon selection of one or more of the currently open windows, transparency toggler 330 may store an indication of the status of the window as being transparent and transmit an instruction to display module 340 to make the window transparent. In the present embodiment, the user also has an option to toggle the transparency of a window with respect to other windows and/or desktop objects. In response to an instruction to toggle, transparency toggler 330 determines the current state of the transparency of the window, which may involve reading a status from memory, and adjusts the status to make the window transparent or opaque with respect to other windows and/or desktop objects. In some embodiments, transparency toggler 330 may toggle between more than one levels of transparency.

Display module 340 may interface with a display adapter to display menus for menu manager 324 (or at least menu options) and toggle the transparency of windows. In several embodiments, display module 340 may instruct the display adapter to make a window transparent or not. In the present embodiments, display module 340 comprises a transparency manager 342 to execute algorithms to implement transparency for menus. For instance, transparency manager 342 may determine objects or text to block or obscure based upon overlapping windows and the layers associated with the overlapping windows.

Figure 4:
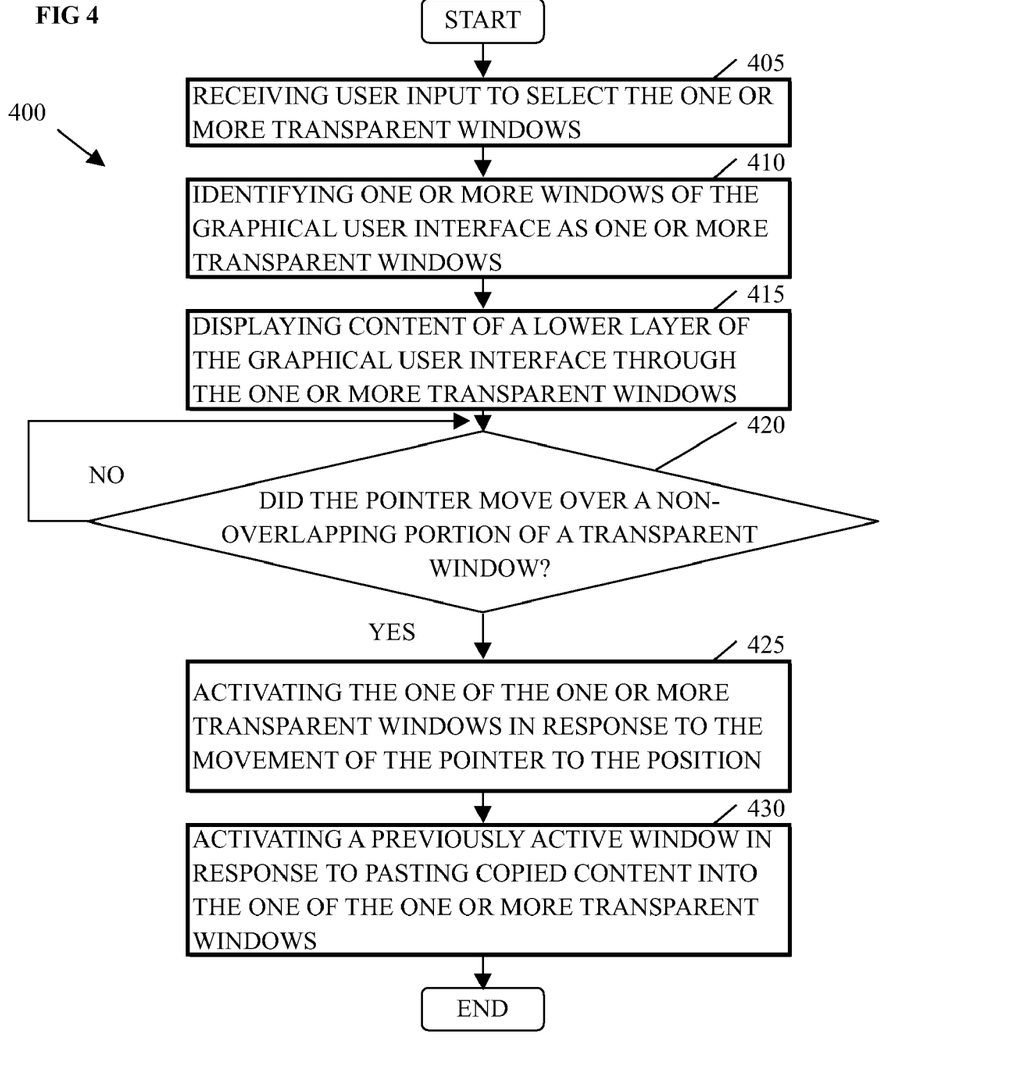
FIG. 4 illustrates a flow chart of an embodiment of a graphical user interface (GUI) to manage transparent windows.

FIG. 4 illustrates a flow chart 400 of an embodiment of a graphical user interface (GUI) to manage transparent windows. Flow chart 400 begins with receiving user input to select the one or more transparent windows (element 405). For example, the user may point at a menu icon at the top of a display and click on the menu icon to pull down a menu that includes options to select one or more windows to make transparent and, in some embodiments, one or more options to identify one or more of the transparent windows as opaque with respect to one or more objects on a desktop of the GUI. The user may then select windows via the menu. In further embodiments, the user may point at buttons on the border of a window to make transparent and press a button or key on a keyboard to select the option. In still further embodiments, quick keys entered via the keyboard may indicate that, e.g., the user wants to toggle the transparency of the currently active window, to toggle the visibility of the desktop via transparent windows, or to make one or all open windows transparent.

In response to the selection of windows to make transparent and an indication or default setting for the visibility of the desktop, management logic may identify the one or more windows as transparent to a display adapter (element 410) and the display adapter may display the windows as transparent on a display by displaying content of a lower layer of the graphical user interface through the one or more transparent windows (element 415). In particular, each window is associated with a layer to indicate whether or not the window is above another object or window. When the window is made transparent, content such as objects and text that would otherwise be unviewable because they are beneath an opaque window, may become visible after the opaque window is made transparent. Furthermore, if one or more objects on the desktop are set to invisible, they may not be visible if a transparent window overlaps the one or more objects.

At decision block 420, the management logic may select windows to activate based upon the position and/or movement of a pointer such as pointer 230 of FIGS. 2A-D. For instance, movement of the pointer over another transparent window after copying text from the currently active window, may represent an instruction from the user to make the other transparent window the active window. If so, the management logic may make the other transparent window the active window in response to the movement of the pointer (element 425).

If the currently active window was activated based upon copying content of the previously active window and moving the pointer over the currently active window, the management logic may activate the previously active window in response to pasting copied content into the currently active window (element 430). For example, a user may wish to copy content from a first window to a second window so the management logic may facilitate this by automatically switching the active window between the first window and the second window based upon movement of the pointer.

Figure 5:
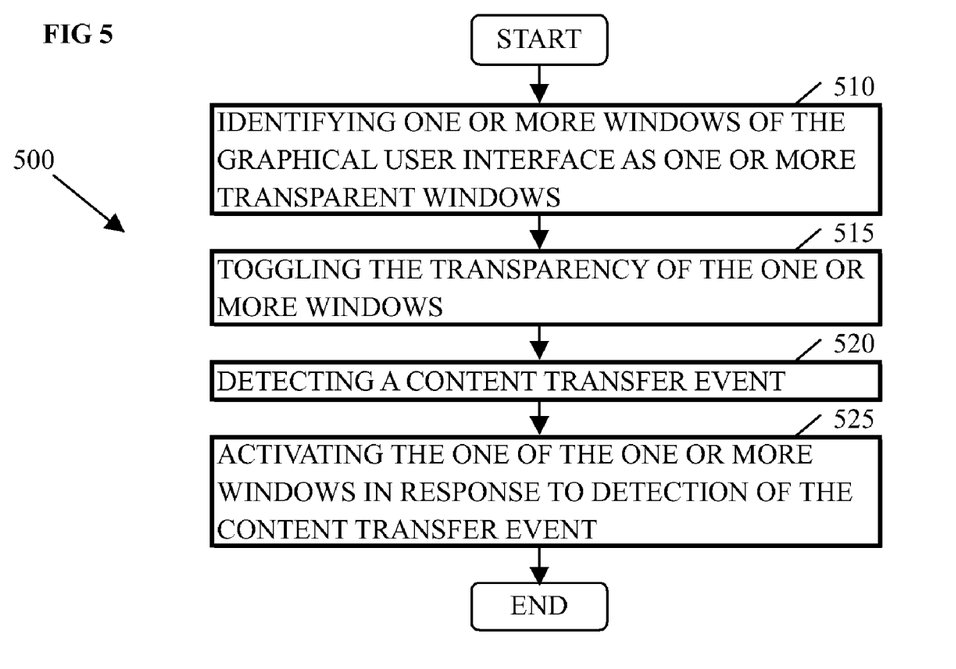
FIG. 5 illustrates a flow chart of a further embodiment of a GUI to manage transparent windows.

FIG. 5 illustrates a flow chart 500 of a further embodiment of a graphical user interface (GUI) to manage transparent windows for a system such as the system described in conjunction with FIG. 1. Flow chart 500 begins with identifying one or more windows of the graphical user interface as one or more transparent windows (element 510) and toggling the transparency of the one or more identified windows (element 515). In particular, the user may select windows to make transparent and then select a transparency toggle menu option in a pop-up menu. In response, the management logic may toggle the windows to a state of transparency with respect to other windows and/or objects on the desktop.

Once the windows are made transparent, the management logic may monitor the user's input to detect a content transfer from a first transparent window to a second transparent window (element 520). In several embodiments, only one of the windows needs to be designated as a transparent window to trigger action by the management logic.

In response to a content transfer such as dragging content from one transparent window in the direction of a second transparent window, the management logic may activate the second transparent window (element 525). In further embodiments, such as embodiments in which two windows are transparent, copying or dragging content of one transparent window may automatically trigger the management logic to switch the active window to the other transparent window.

Another embodiment of the invention is implemented as a program product on a computer or for installation on hardware such as systems and methods described with reference to FIGS. 1-5. The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For purposes of this description, a computer-usable or computer readable medium can be any apparatus that can contain the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-RAN), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates methods and arrangements to manage transparent windows of a graphical user interface (GUI). It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing transparent windows, the method comprising the steps of:
    a computer receiving an input to display a first window that is open on a graphical user interface as a transparent window, and in response, the computer displaying, through the first window, content on a layer of the graphical user interface that is beneath the first window;
    the computer receiving an input to drag or copy content in the first window; and
    the computer predicting that the content in the first window will be dropped or pasted into a second window that is open on the graphical user interface, and in response, the computer activating the second window before the content in the first window is dropped or pasted into the second window;
    wherein the step of the computer predicting that the content of the first window will be dropped or pasted into the second window comprises the step of the computer identifying a historical pattern of one or more of dropping content dragged from the first window into the second window and pasting content copied from the first window into the second window.

2. The method of claim 1, further comprising the step of the computer activating the first window in response to the content in the first window being dropped or pasted into the second window.

3. The method of claim 1, further comprising the step of:
    after the step of the computer displaying, through the first window, the content on the layer of the graphical user interface that is beneath the first window, the computer making an object on a desktop of the graphical user interface invisible through the first window.

4. The method of claim 1, further comprising the step of:
    after the step of the computer activating the second window, the computer obscuring the content in the first window.

5. The method of claim 1, further comprising the steps of:
    the computer receiving an input to display the second window as a transparent window, and in response, the computer displaying, through the second window, content on a layer of the graphical user interface that is beneath the second window.

6. The method of claim 1, further comprising the step of:
    before the step of the computer receiving the input to display the first window as a transparent window, the computer displaying a menu comprising one or more options, the one or more options including at least one of an option to display the first window as a transparent window and an option to display all open windows as transparent windows;
    wherein the step of the computer receiving the input to display the first window as a transparent window comprises the computer receiving a selection of one of the one or more options.

7. The method of claim 1, further comprising the step of:
before the step of the computer receiving the input to display the first window as a transparent window, the computer displaying a list comprising an identification of the first window and an identification of the second window;
wherein the step of the computer receiving the input to display the first window as a transparent window comprises the computer receiving a selection of the identification of the first window from the list.

8. The method of claim 1, wherein the step of the computer receiving the input to display the first window as a transparent window comprises the step of the computer detecting a selection of a graphical check box on a border of the first window.

9. A computer system for managing transparent windows, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to receive an input to display a first window that is open on a graphical user interface as a transparent window, and in response, to display, through the first window, content on a layer of the graphical user interface that is beneath the first window;
program instructions, stored on at least one of the one or more storage devices for execution by at least one of the one or more processors via at least one of the one or more memories, to receive an input to drag or copy content in the first window; and
program instructions, stored on at least one of the one or more storage devices for execution by at least one of the one or more processors via at least one of the one or more memories, to predict that the content in the first window will be dropped or pasted into a second window that is open on the graphical user interface, and in response, to activate the second window before the content in the first window is dropped or pasted into the second window;
wherein the program instructions to predict that the content of the first window will be dropped or pasted into the second window identify a historical pattern of one or more of dropping content dragged from the first window into the second window and pasting content copied from the first window into the second window.

10. The computer system of claim 9, further comprising:
program instructions, stored on at least one of the one or more storage devices for execution by at least one of the one or more processors via at least one of the one or more memories, to activate the first window in response to the content in the first window being dropped or pasted into the second window.

11. The computer system of claim 9, further comprising:
program instructions, stored on at least one of the one or more storage devices for execution by at least one of the one or more processors via at least one of the one or more memories, to make an object on a desktop of the graphical user interface invisible through the first window after displaying, through the first window, the content on the layer of the graphical user interface that is beneath the first window.

12. The computer system of claim 9, further comprising:
program instructions, stored on at least one of the one or more storage devices for execution by at least one of the one or more processors via at least one of the one or more memories, to obscure the content in the first window after activating the second window.

13. The computer system of claim 9, further comprising:
program instructions, stored on at least one of the one or more storage devices for execution by at least one of the one or more processors via at least one of the one or more memories, to receive an input to display the second window as a transparent window, and in response, to display, through the second window, content on a layer of the graphical user interface that is beneath the second window.

14. The computer system of claim 9, further comprising:
program instructions, stored on at least one of the one or more storage devices for execution by at least one of the one or more processors via at least one of the one or more memories, to display a menu comprising one or more options before receiving the input to display the first window as a transparent window, the one or more options including at least one of an option to display the first window as a transparent window and an option to display all open windows as transparent windows;
wherein the program instructions to receive the input to display the first window as a transparent window receive a selection of one of the one or more options.

15. The computer system of claim 9, further comprising:
program instructions, stored on at least one of the one or more storage devices for execution by at least one of the one or more processors via at least one of the one or more memories, to display a list comprising an identification of the first window and an identification of the second window before receiving the input to display the first window as a transparent window;
wherein the program instructions to receive the input to display the first window as a transparent window receive a selection of the identification of the first window from the list.

16. The computer system of claim 9, wherein the program instructions to receive the input to display the first window as a transparent window detect a selection of a graphical check box on a border of the first window.

17. A computer program product for managing transparent windows, the computer program product comprising:
one or more computer-readable tangible storage devices;
program instructions, stored on at least one of the one or more storage devices, to receive an input to display a first window that is open on a graphical user interface as a transparent window, and in response, to display, through the first window, content on a layer of the graphical user interface that is beneath the first window;
program instructions, stored on at least one of the one or more storage devices, to receive an input to drag or copy content in the first window; and
program instructions, stored on at least one of the one or more storage devices, to predict that the content in the first window will be dropped or pasted into a second window that is open on the graphical user interface, and in response, to activate the second window before the content in the first window is dropped or pasted into the second window;
wherein the program instructions to predict that the content of the first window will be dropped or pasted into the second window identify a historical pattern of one or more of dropping content dragged from the first window into the second window and pasting content copied form the first window into the second window.

18. The computer program product of claim 17, further comprising program instructions, stored on at least one of the one or more storage devices, to activate the first window in response to the content in the first window being dropped or pasted into the second window.

19. The computer program product of claim 17, further comprising:
   program instructions, stored on at least one of the one or more storage devices, to make an object on a desktop of the graphical user interface invisible through the first window after displaying, through the first window, the content on the layer of the graphical user interface that is beneath the first window.

20. The computer program product of claim 17, further comprising:
   program instructions, stored on at least one of the one or more storage devices, to obscure the content in the first window after activating the second window.

21. The computer program product of claim 17, further comprising:
   program instructions, stored on at least one of the one or more storage devices, to receive an input to display the second window as a transparent window, and in response, to display, through the second window, content on a layer of the graphical user interface that is beneath the second window.

22. The computer program product of claim 17, further comprising:
   program instructions, stored on at least one of the one or more storage devices, to display a menu comprising one or more options before receiving the input to display the first window as a transparent window, the one or more options including at least one of an option to display the first window as a transparent window and an option to display all open windows as transparent windows;
   wherein the program instructions to receive the input to display the first window as a transparent window receive a selection of one of the one or more options.

23. The computer program product of claim 17, further comprising:
   program instructions, stored on at least one of the one or more storage devices, to display a list comprising an identification of the first window and an identification of the second window before receiving the input to display the first window as a transparent window;
   wherein the program instructions to receive the input to display the first window as a transparent window receive a selection of the identification of the first window from the list.

24. The computer program product of claim 17, wherein the program instructions to receive the input to display the first window as a transparent window detect a selection of a graphical check box on a border of the first window.

\* \* \* \* \*